United States Patent
Casali

(10) Patent No.: US 11,383,574 B2
(45) Date of Patent: Jul. 12, 2022

(54) VEHICLE TWIST AXLE ASSEMBLY

(71) Applicants: MAGNA INTERNATIONAL INC., Aurora (CA); Frank Nick Casali, Shelby Township, MI (US)

(72) Inventor: Frank Nick Casali, Shelby Township, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 17/041,001

(22) PCT Filed: Mar. 29, 2019

(86) PCT No.: PCT/US2019/024804
§ 371 (c)(1),
(2) Date: Sep. 24, 2020

(87) PCT Pub. No.: WO2019/191567
PCT Pub. Date: Oct. 3, 2019

(65) Prior Publication Data
US 2021/0206225 A1    Jul. 8, 2021

Related U.S. Application Data

(60) Provisional application No. 62/649,947, filed on Mar. 29, 2018.

(51) Int. Cl.
*B60G 21/05*    (2006.01)
*B60B 35/00*    (2006.01)
(Continued)

(52) U.S. Cl.
CPC .......... *B60G 21/052* (2013.01); *B60B 35/006* (2013.01); *B60B 35/04* (2013.01);
(Continued)

(58) Field of Classification Search
CPC .. B60G 21/052; B60G 7/008; B60G 2200/21; B60G 2200/46; B60G 2200/462;
(Continued)

(56) References Cited

U.S. PATENT DOCUMENTS 4,693,487 A * 9/1987 Cooper .................. B62D 17/00
                                                280/86.751
5,909,888 A * 6/1999 Betz ..................... B60G 21/051
                                                280/124.166
(Continued)

FOREIGN PATENT DOCUMENTS

CN       106240276 A  * 12/2016
DE       19520520 A1 * 12/1995    ........... B60G 21/051
(Continued)

OTHER PUBLICATIONS

Machine Translation of DE19520520 (Year: 1995).*

*Primary Examiner* — Paul N Dickson
*Assistant Examiner* — Kurtis Nielson
(74) *Attorney, Agent, or Firm* — Dickinson Wright PLLC

(57) ABSTRACT

The twist axle assembly includes a cross beam that extends along a length between opposite ends, and a pair of trailing arms are fixedly attached with the opposite ends. A spindle plate is fixedly attached with each of the trailing arms. For each spindle plate and trailing arm combination, the spindle plate and trailing arm are provided with cooperating orbital adjustment features which allow an orientation of the spindle plate relative to the trailing arm to be adjusted prior to the spindle plate being fixedly attached with the trailing arm for allowing preselection of a camber angle, a caster angle, and a toe angle for a wheel to be coupled with the spindle plate.

15 Claims, 6 Drawing Sheets

(51) Int. Cl.
*B60B 35/04* (2006.01)
*B60G 7/00* (2006.01)

(52) U.S. Cl.
CPC .......... *B60G 7/008* (2013.01); *B60G 2200/21* (2013.01); *B60G 2200/46* (2013.01); *B60G 2200/462* (2013.01); *B60G 2200/464* (2013.01); *B60G 2202/136* (2013.01); *B60G 2204/148* (2013.01); *B60G 2204/61* (2013.01); *B60G 2206/20* (2013.01); *B60G 2206/8201* (2013.01)

(58) Field of Classification Search
CPC ........ B60G 2200/464; B60G 2202/136; B60G 2206/20; B60B 35/006; B60B 35/04
See application file for complete search history.

(56) References Cited

U.S. PATENT DOCUMENTS

| | | | | |
|---|---|---|---|---|
| 6,267,397 B1 * | 7/2001 | Hamada | ................... | B60G 9/02 280/124.128 |
| 7,090,233 B2 * | 8/2006 | Shin | ...................... | B60G 7/008 280/93.512 |
| 7,832,749 B2 * | 11/2010 | Lee | ...................... | B60G 21/051 280/124.116 |
| 7,878,516 B2 * | 2/2011 | Gottschalk | ............ | B60G 11/27 280/86.5 |
| 2003/0090079 A1 | 5/2003 | Chevillard | | |
| 2004/0007846 A1 * | 1/2004 | Inoue | .................... | B60G 7/008 280/124.166 |
| 2006/0033303 A1 * | 2/2006 | Shin | ..................... | B60G 21/051 280/124.128 |
| 2006/0138740 A1 * | 6/2006 | Nam | ..................... | B60G 7/008 280/86.756 |
| 2007/0290474 A1 * | 12/2007 | Inoue | ................... | B60G 21/051 280/124.166 |
| 2010/0059961 A1 * | 3/2010 | Kato | .................... | B60G 21/051 280/124.166 |
| 2013/0093156 A1 | 4/2013 | Buschjohann et al. | | |
| 2016/0221408 A1 | 8/2016 | Niggemeyer et al. | | |
| 2018/0009478 A1 | 1/2018 | Merrill et al. | | |
| 2020/0009959 A1 * | 1/2020 | Fukasawa | ............ | B60K 7/0007 |

FOREIGN PATENT DOCUMENTS

| | | | | |
|---|---|---|---|---|
| DE | 19520520 A1 | | 12/1995 | |
| EP | 2727753 A1 | * | 5/2014 | ........... B60G 21/052 |
| KR | 100911402 B1 | * | 8/2009 | |
| KR | 20090124402 A | * | 12/2009 | |
| KR | 20110075830 A | * | 7/2011 | |
| KR | 20110095069 A | * | 8/2011 | |
| KR | 20120074532 A | * | 7/2012 | |
| KR | 101304675 B1 | * | 9/2013 | |
| KR | 101909445 B1 | * | 10/2018 | |
| KR | 20200109709 A | * | 9/2020 | |

* cited by examiner

US 11,383,574 B2

VEHICLE TWIST AXLE ASSEMBLY

CROSS-REFERENCE TO RELATED APPLICATIONS

This U.S. National Stage Patent Application claims the benefit of PCT International Patent Application Serial No. PCT/2019/02480404 filed Mar. 29, 2019 entitled "Vehicle Twist Axle Assembly" which claims the benefit of and priority to U.S. Provisional Application Ser. No. 62/649,947, filed on Mar. 29, 2018 and titled "Vehicle Twist Axle Assembly", the entire disclosures of which are hereby incorporated by reference.

BACKGROUND OF THE INVENTION

1. Field of the Invention

The present invention is related, generally, to twist axle assemblies of the type for use in vehicle suspension systems.

2. Related Art

A twist beam axle assembly, also known as a torsion beam axle, is a type of automobile suspension system which makes use of the twisting action of a cross beam to resist relative movement of opposing wheels in a vehicle. That is, during operation of the vehicle, the twist beam resiliently (i.e., elastically) deforms in a twisting manner to provide roll stiffness as the vehicle corners at speed.

Twist axle assemblies typically include a pair of trailing arms that are positioned at opposite ends of the cross beam. A spindle plate is fixedly attached with each of the trailing arms for supporting a stub axle which, in turn, supports a wheel. Vehicle manufacturers design their vehicles so that the wheels have specific camber angles, caster angles, and toe angles to optimize performance, efficiency, and tire life. One known way to orient the wheels mounted on the stub axles to meet the manufacturer's camber angle, caster angle, and toe angle requirements is to machine outboard faces of the spindle plates so that when the stub axles and wheels are attached with the outboard faces, the wheels are held in the desired orientations. However, this machining operation requires large investment and manufacturing costs and also requires substantial cycle time to machine metal from the spindle plate. This machining operation also leads to material waste since the spindle plate must be initially made very thick to allow for the removal of material therefrom without compromising its strength.

There remains a significant and continuing need for an improved twist axle assembly which can support a pair of wheels with prescribed camber, caster, and toe angles without the need for machining the spindle plates.

SUMMARY OF THE INVENTION

One aspect of the present invention is related to a twist axle assembly for a vehicle. The twist axle assembly includes a cross beam that extends along a length between opposite ends, and a pair of trailing arms are fixedly attached with the opposite ends. A spindle plate is fixedly attached with each of the trailing arms. For each spindle plate and trailing arm combination, the spindle plate and trailing arm are provided with cooperating orbital adjustment features which allow an orientation of the spindle plate relative to the trailing arm to be adjusted prior to the spindle plate being fixedly attached with the trailing arm for allowing preselection of a camber angle, a caster angle, and a toe angle for a wheel to be coupled with the spindle plate.

In comparison to other known means of preselecting camber, caster, and toe angles by machining the spindle plate, the present invention allows for mass savings in the twist axle assembly and waste reduction in the manufacturing operation because the spindle plate does not have to be initially formed with an increased material thickness to allow for material to be removed during the machining operation. The present invention also allows for cost savings by eliminating the manufacturing step of machining the spindle plates.

According to another aspect of the present invention, the cooperating orbital adjustment features include a male projection formed into one of the spindle plate and the trailing arm and a female socket formed into the other of the spindle plate and the trailing arm.

According to yet another aspect of the present invention, at least one of the male projection and the female socket is curved radially inwardly or outwardly adjacent its respective distal end and wherein the male projection and female socket are fixedly attached with one another via a weld joint that is located at a ring of surface-to-surface contact between the male projection and the female socket.

According to still another aspect of the present invention, both of the male projection and the female socket are curved radially adjacent their respective distal ends.

According to another aspect of the present invention, the female socket is a flange formed on the spindle plate, and the male projection is an end of the trailing arm.

According to yet another aspect of the present invention, the spindle plate, including the flange, is made as a monolithic piece.

According to still another aspect of the present invention, the flange is initially made as a separate piece from and is fixedly attached with the remainder of the spindle plate.

According to another aspect of the present invention, the female socket is an end of the trailing arm, and the male projection is a flange on the spindle plate.

Another aspect of the present invention is related to a method of making a twist axle assembly. The method includes the step of fixedly attaching trailing arms with opposite ends of a cross beam. For each of the trailing arms, the method further includes the step of articulating the spindle plate relative to the trailing arm until the spindle plate is in a predetermined orientation with a ring of surface-to-surface contact being present between the male projection and the female socket. The method continues with the step of fixedly attaching the spindle plate with the trailing arm at the ring of surface-to-surface contact to maintain the spindle plate in the predetermined orientation.

According to another aspect of the present invention, the step of fixedly attaching the spindle plate with the trailing arm is further defined as welding the spindle plate to the trailing arm.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
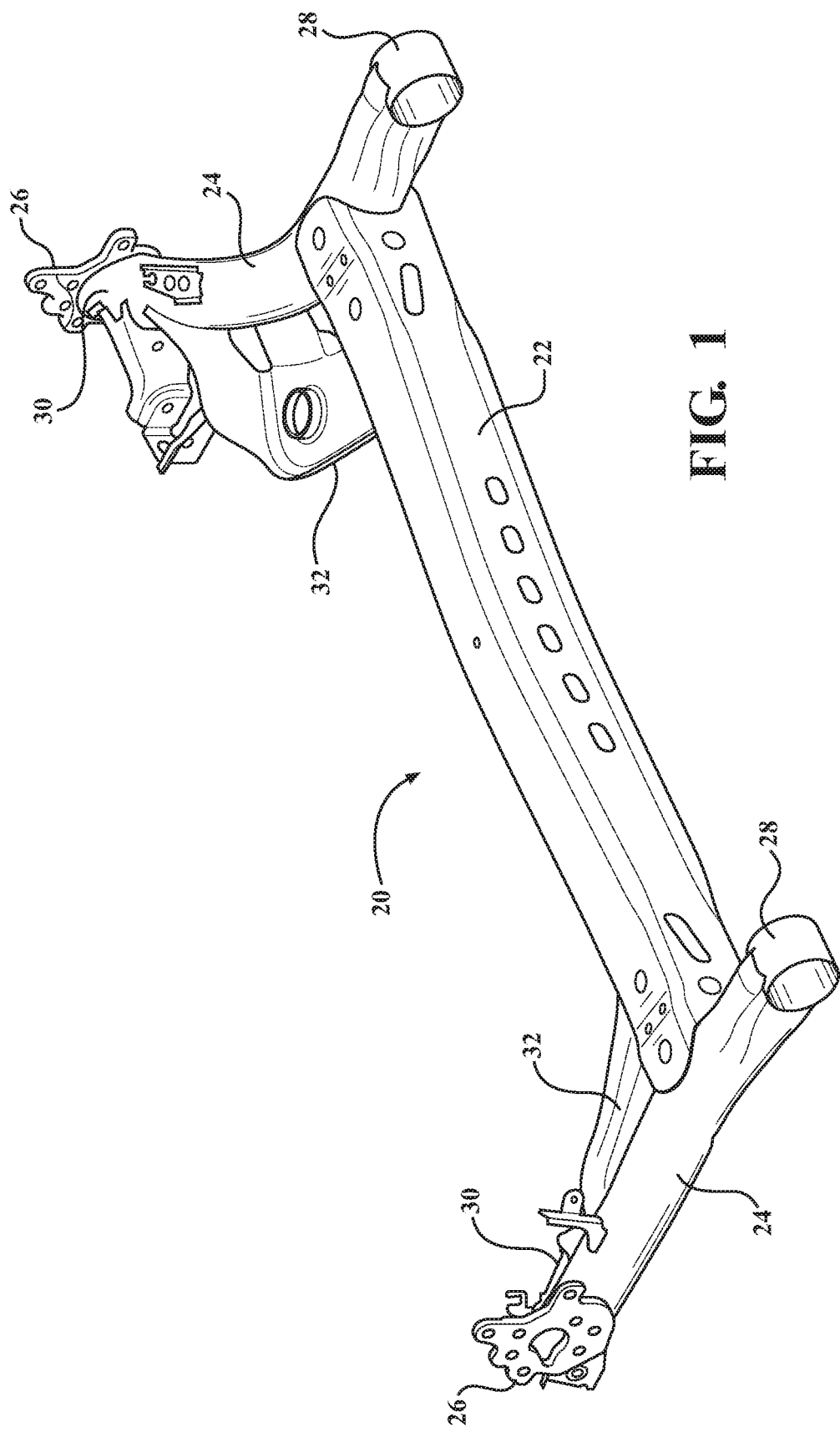
FIG. 1 is a perspective view of a first embodiment of a twist axle assembly constructed according to one aspect of the present invention.

Referring to the Figures, wherein like numerals indicate corresponding parts throughout the several views, a first exemplary embodiment of an improved twist axle assembly 20 for use in a vehicle system is generally shown in FIG. 1. The twist axle assembly 20 includes a cross beam 22 (also known as a cross-member or a twist-beam) which extends between and is operably connected with a pair of trailing arms 24. A spindle plate 26, which is configured to support a stub axle (not shown), is fixedly attached with each trailing arm 24. During operation of the vehicle, up and down movement of the wheels (not shown) causes the cross beam 22 to resiliently and elastically twist and absorb energy by resisting relative to rotation of the trailing arms 24. As discussed in further detail below, the spindle plates 26 are fixable with the trailing arms 24 in different orientations to allow the caster, camber, and toe angles of the wheels to be pre-selected without any additional parts or machining operations.

In the exemplary embodiment, the cross beam 22 has an open faced, stamped sheet design. However, it should be appreciated that a crushed tube design, or any suitable design, could alternately be employed. The cross beam 22 can be fixedly attached with the trailing arms 24 through any suitable connection means including, for example, welding, fasteners, material deformation, etc.

Each trailing arm 24 extends from a first end that is fixedly attached with a bushing 28 for attachment with a vehicle frame (not shown) to a second end 30 that is fixedly attached with the respective spindle plate 26. Each trailing arm 24 has a first portion, which extends generally linearly from the first end, and a second portion, which curves outwardly, i.e., in an outboard direction. The cross beam 22 is fixedly attached (such as, through welding) with the trailing arm 24 in the linear first portion. A spring seat 32 is fixedly attached with the trailing arm 24 in the curved second portion. The trailing arms 24 may be made through any suitable operation or combination of operations including, for example, stamping, rolling, hydroforming, etc.

Each spindle plate 26 is joined with the trailing arm 24 via an orbitally adjustable connection means which includes a male projection on either the spindle plate 26 or the trailing arm 24 and a female socket on the other. As discussed in further detail below, the male projection and female socket are configured in such a manner that the spindle plate 26 can be adjusted about three axes into a wide range of orientations relative to the trailing arm 24 before these components are welded together. Each of the male projection and the female socket has a cross-sectional shape which is generally circular, and at least one of the male projection and the female socket is curved either radially inwardly or radially outwardly towards its respective distal end. The radially inward or outward curvature allows the spindle plate 26 to be articulated relative to the trailing arm 24 about two axis or to be rotated relative to the trailing arm 24 about a third axis after the male projection has been partially inserted into the female socket while maintaining a suitable surface of contact for welding between the male projection and the female socket.

By articulating and rotating the spindle plate 26 relative to the trailing arm 24, a user or robot can selectively choose the caster, camber, and toe angles that a wheel which will eventually be attached with the spindle plate 26 will have. No machining or additional finishing processes for the spindle plate 26 are necessary. Since the same components and the same manufacturing equipment to be used to create twist axle assemblies 20 that have different camber, caster, and toe angles, manufacturing cost savings through economies of scale can be realized.

Figure 2:
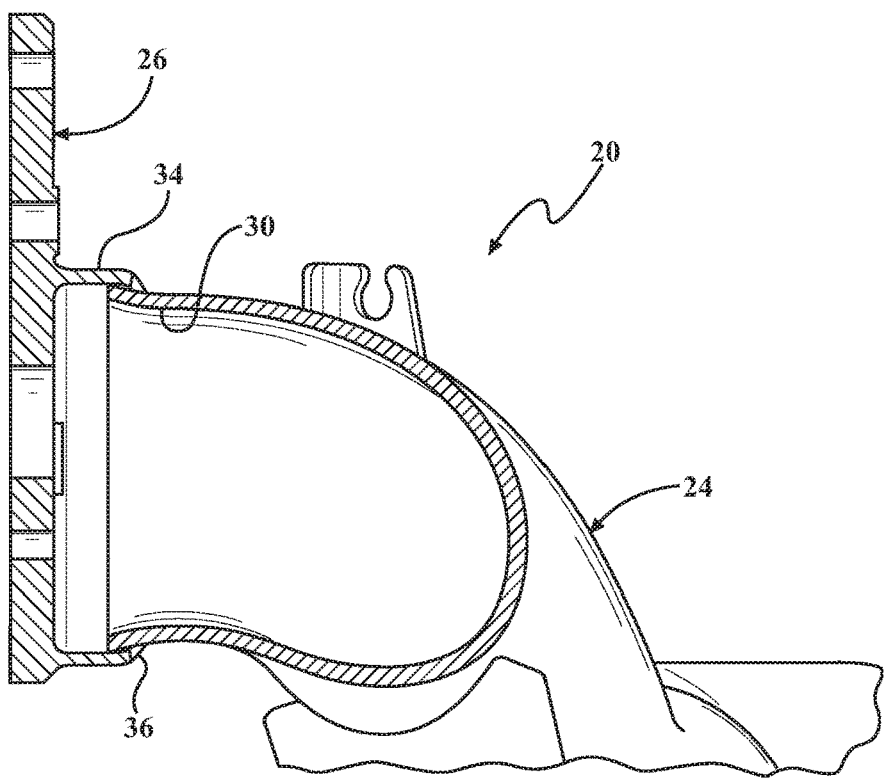
FIG. 2 is a sectional view of the twist axle assembly of FIG. 1.
Figure 3:
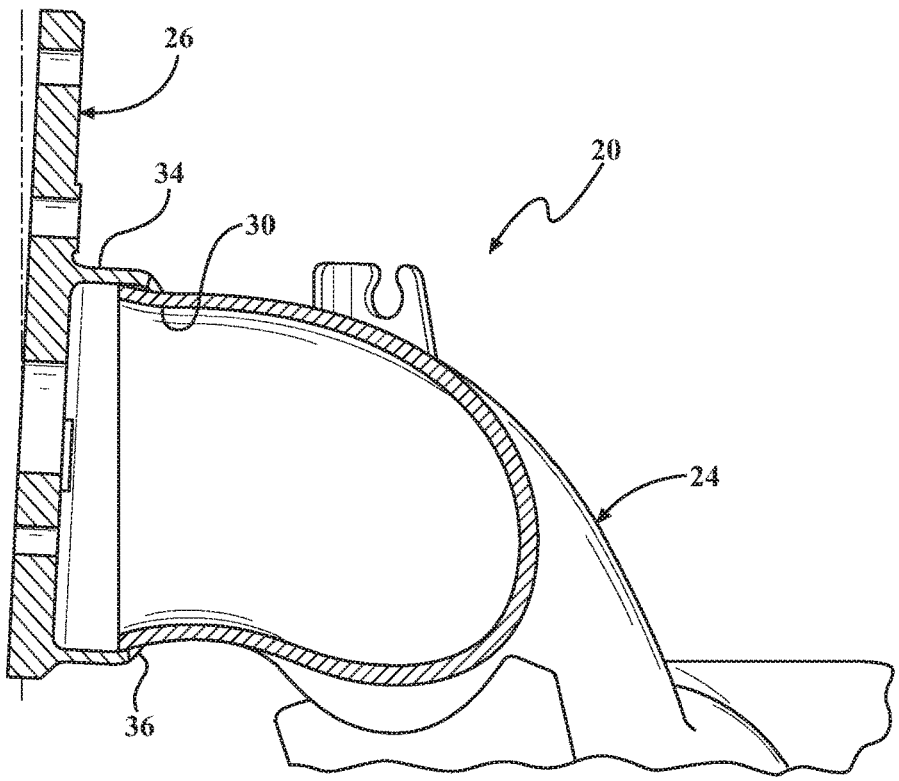
FIG. 3 is another sectional view of the twist axle assembly of FIG. 1 but with a spindle plate angled to provide a wheel with a negative camber angle.
Figure 4:
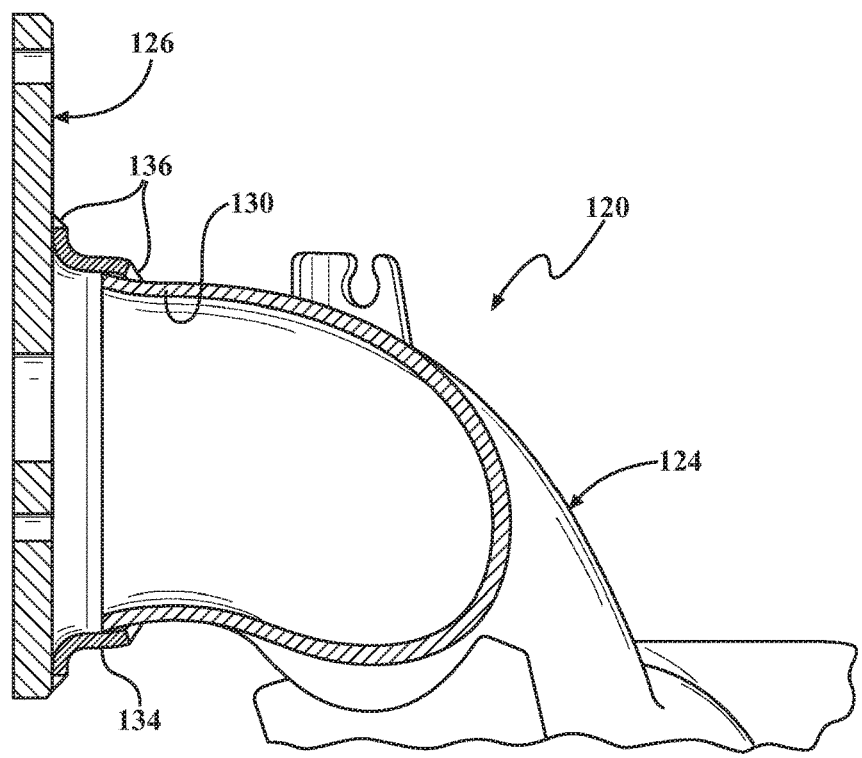
FIG. 4 is a sectional view of a second embodiment of the twist axle assembly.

FIGS. 2-4 show a first exemplary embodiment of the improved twist axle assembly 20 which can be configured to provide a pair of wheels with desired camber, caster, and toe angles. In this embodiment, the female socket is a part of the spindle plate 26. More specifically, the spindle plate 26 has an annular flange 34 which projects from an inboard face thereof and which extends to a distal end. The second end 30 of the trailing arm 24 serves as the male projection that is sized so that it can be received into a space inside of the annular flange 34.

The flange 34 and the second end 30 of the trailing arm 24 are provided with corresponding curvatures which allow the spindle plate 26 to be articulated and rotated relative to the trailing arm 24 in the manner described above. More specifically, as it extends axially away from the inboard face of the spindle plate 26, the flange 34 is curved radially inwardly towards its distal end, and adjacent its end face, the second end 30 of the trailing arm is curved radially outwardly. These cooperating curvatures allow a ring of surface-to-surface contact to be established between the spindle plate 26 and the trailing arm 24 and allow this ring of contact to be maintained even as the spindle plate 26 is rotated and articulated through a wide range of different orientations. Once the spindle plate 26 is in the desired orientation, it is held in place, and an end face of the spindle plate 26 is welded to the trailing arm 24. The welding operation preferably forms a weld joint 36 which extends 360° around the trailing arm 24, thereby establishing a strong and durable permanent connection between the spindle plate 26 and the trailing arm 24.

For example, FIG. 2 shows the spindle plate 26 fixedly attached with the trailing arm 24 in such a way that the wheel will have camber and caster angles of approximately zero degrees (0°), and FIG. 3 shows the same spindle plate 26 being rotated relative to the trailing arm 24 about a longitudinally extending axis such that the wheel (not shown) which will eventually mated with the spindle plate 26 will have a negative camber angle θ.

In the first exemplary embodiment (FIG. 2), the flange 34, which defines the female socket, is made as a monolithic piece with the remainder of the spindle plate 26. This single piece is preferably made through a casting operation using steel or an alloy steel. By casting the single-piece spindle plate 26 to its final shape, the flange 34 can be made with a reduced wall thickness as compared to the surrounding portions of the spindle plate 26, and a separate welding operation to fixedly attach the flange 34 with the remainder of the spindle plate 26 is not necessary.

Referring now to FIG. 4, a second exemplary embodiment of the twist axle assembly 120 is generally shown wherein like numerals, separated by a prefix of "1", identify corresponding parts with the above-described embodiment. In the second embodiment, the flange 134 is initially made as a separate piece from the remainder of the spindle plate 126, and these components are welded together prior to attaching the spindle plate 126 with the trailing arm 124. Therefore, while the spindle plate 136 is not made as a monolithic piece, it is a single piece at the time that it is joined with the trailing arm 124. Also, in this embodiment, the flange 134 is curved radially outwardly where it meets the remainder of the spindle plate 126 to increase the surface-to-surface contact area between these components, thereby allowing for a stronger, more durable connection there between.

Figure 5:
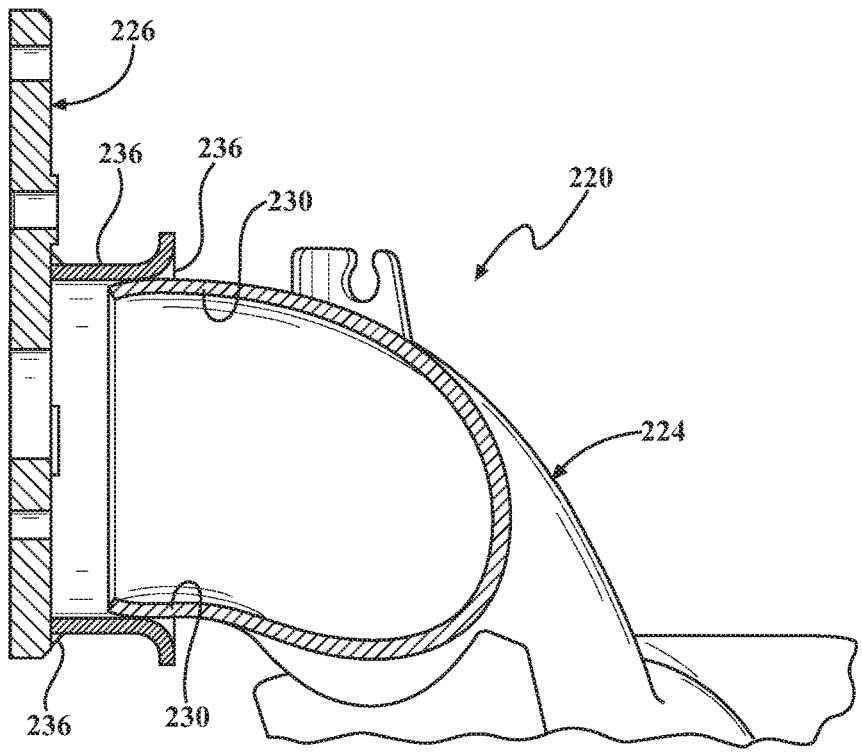
FIG. 5 is a sectional view of a third embodiment of the twist axle assembly.

Referring now to FIG. 5, a third exemplary embodiment of the twist axle assembly 220 is generally shown wherein like numerals, separated by a prefix of "2", identify corresponding parts with the above-described embodiments. In the third embodiment, the flange 234 of the spindle plate 226 and the second end 230 of the trailing arm 224 curve in opposite radial directions from one another. More specifically, in this embodiment, the second end 230 of the trailing arm 224 curves radially inwardly while the flange 234 of the spindle plate 226 curves radially outwardly. This configuration also allows the spindle plate 226 to be oriented at an angle relative to the trailing arm 224 before welding (or any suitable connection means) to pre-select the camber, caster and toe angles of a wheel before the spindle plate 226 is fixedly attached with the trailing arm 224.

Figure 6:
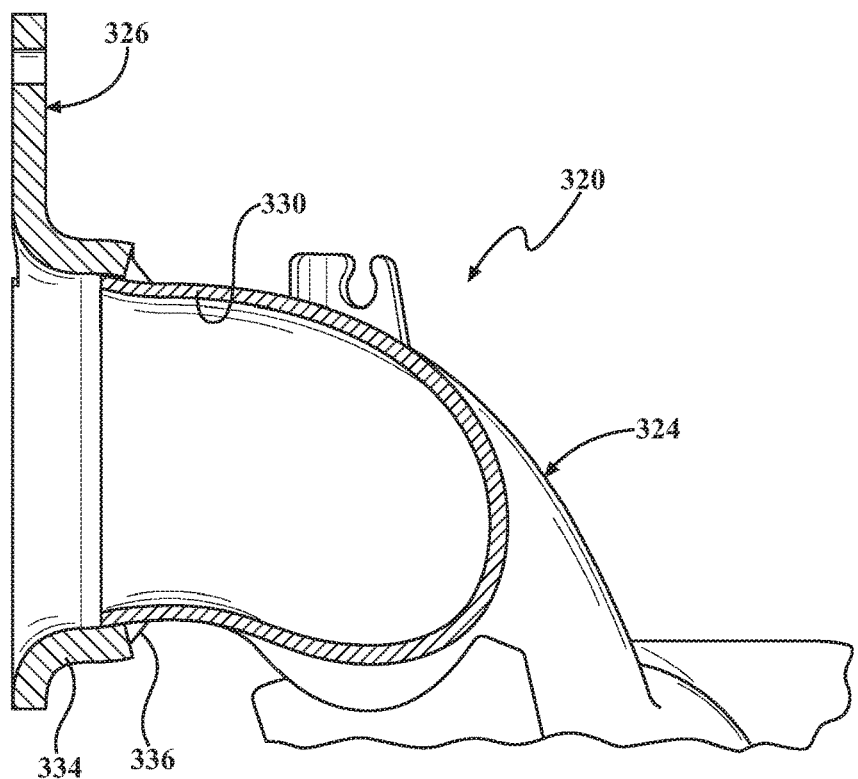
FIG. 6 is a sectional view of a fourth embodiment of the twist axle assembly.

Referring now to FIG. 6, a fourth exemplary embodiment of the twist axle assembly 320 is generally shown wherein like numerals, separated by a prefix of "3", identify corresponding parts with the above-described embodiments. Similar to the embodiment of FIGS. 2-4, in this embodiment, the flange 334 is made as a single, monolithic piece with the remainder of the spindle plate 326. However, in this embodiment, the flange 334 is formed into the spindle plate 326 by bending through a stamping operation, and thus, the flange 334 has a similar wall thickness to the remainder of the spindle plate 326. The stamping operation may be advantageous because bending the flange 334 will work harden the material of the spindle plate 326.

Figure 7:
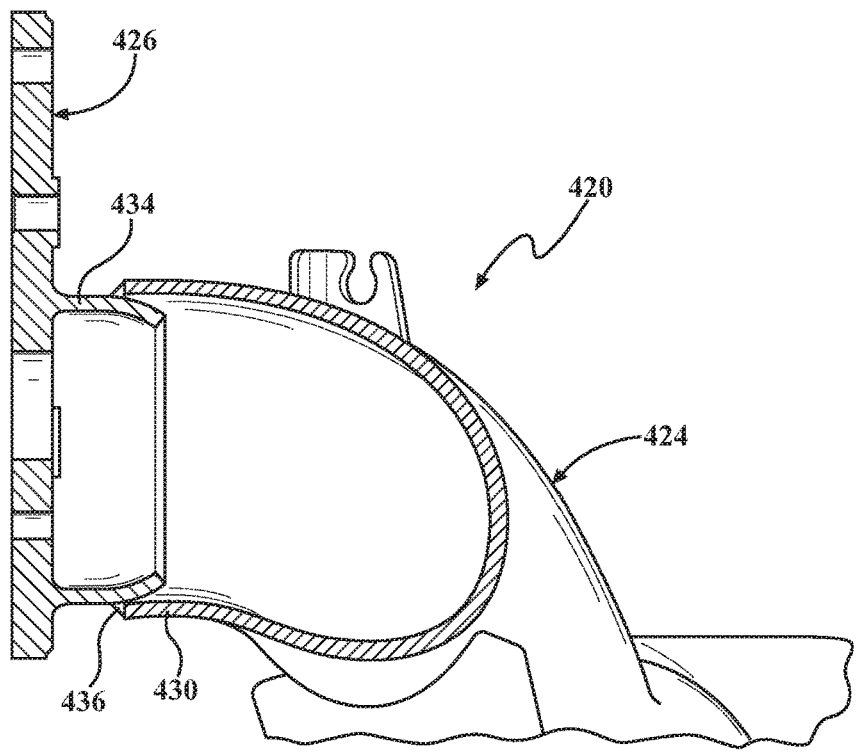
FIG. 7 is a sectional view of a fifth embodiment of the twist axle assembly.
Figure 9:
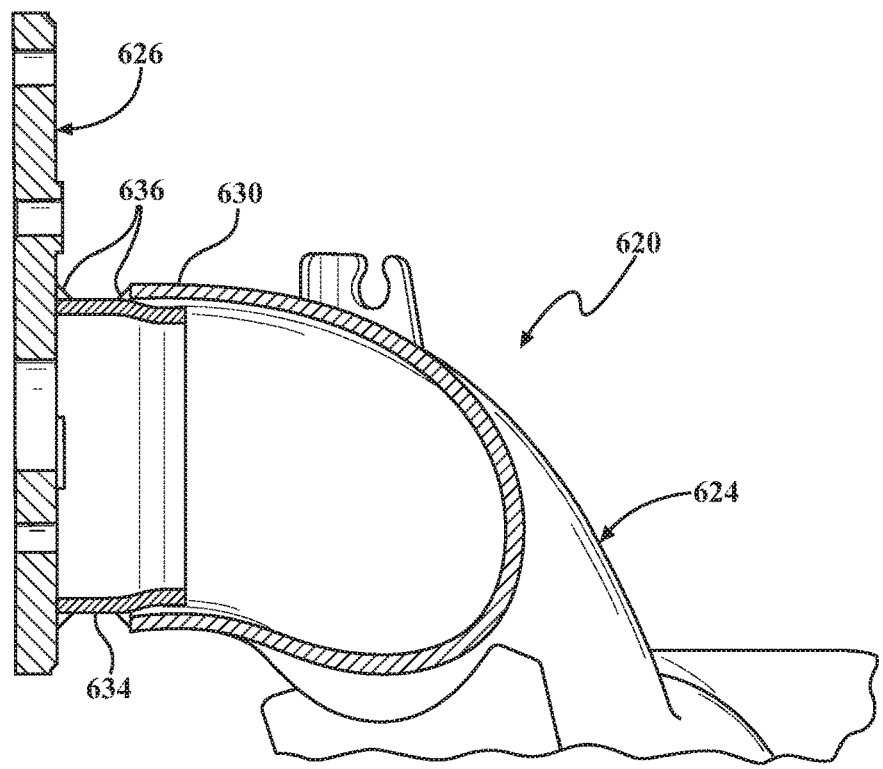
FIG. 9 is a sectional view of the seventh embodiment of the twist axle assembly.

Referring now to FIG. 7, a fifth exemplary embodiment of the twist axle assembly 420 is generally shown wherein like numerals, separated by a prefix of "4", identify corresponding parts with the above-described embodiments. In this embodiment, the second end 430 of the trailing arm 424 serves as the female socket, and the flange 434 of the spindle plate 426 serves as the male projection which is inserted into the female socket. This is the opposite of the first four exemplary embodiments described above. As viewed in cross-section, the second end 430 of the trailing arm 424 extends generally linearly to its distal end, and the flange 434 of the spindle plate 426 is curved radially inwardly adjacent its distal end. As shown in FIG. 9, this configuration allows the spindle plate 426 to be oriented at an angle relative to the second end 430 of the trailing arm 424 while maintaining a ring of surface-to-surface contact between the flange 434 and the trailing arm 424, thereby allowing a strong and durable weld joint to be formed between these components.

Figure 8:
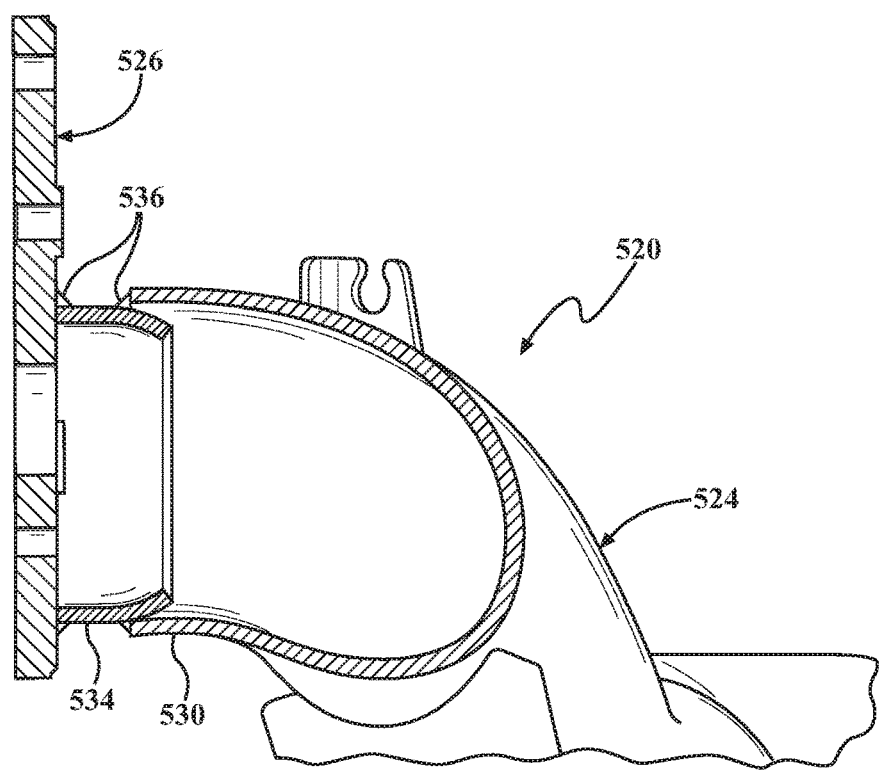
FIG. 8 is a sectional view of the sixth embodiment of the twist axle assembly.

Referring now to FIG. 8, a sixth exemplary embodiment of the twist axle assembly 520 is generally shown wherein like numerals, separated by a prefix of "5", identify corresponding parts with the above-described embodiments. This embodiment is similar to FIG. 7, but the flange 534 is initially made as a separate piece from the remainder of the spindle plate 526 and is welded (or fixedly attached with suitable connection means) thereto.

Referring now to FIG. 9, a seventh exemplary embodiment of the twist axle assembly 620 is generally shown wherein like numerals, separated by a prefix of "6", identify corresponding parts with the above-described embodiments. This embodiment is similar to the embodiment of FIG. 8, but the flange 634 includes two linear portions (with constant diameters) and an S-shaped curved portion which extends between the linear portions. Thus, the flange 634 has a first diameter adjacent the remainder of the spindle plate 626, a lesser second diameter inside of the second end 630 of the trailing arm 624 and transitions from the first diameter to the second diameter in the S-shaped curved portion. The ring of surface-to-surface contact between the spindle plate 626 and the trailing arm 624 occurs in the area of the S-shaped curved portion of the flange 634.

Figure 10:
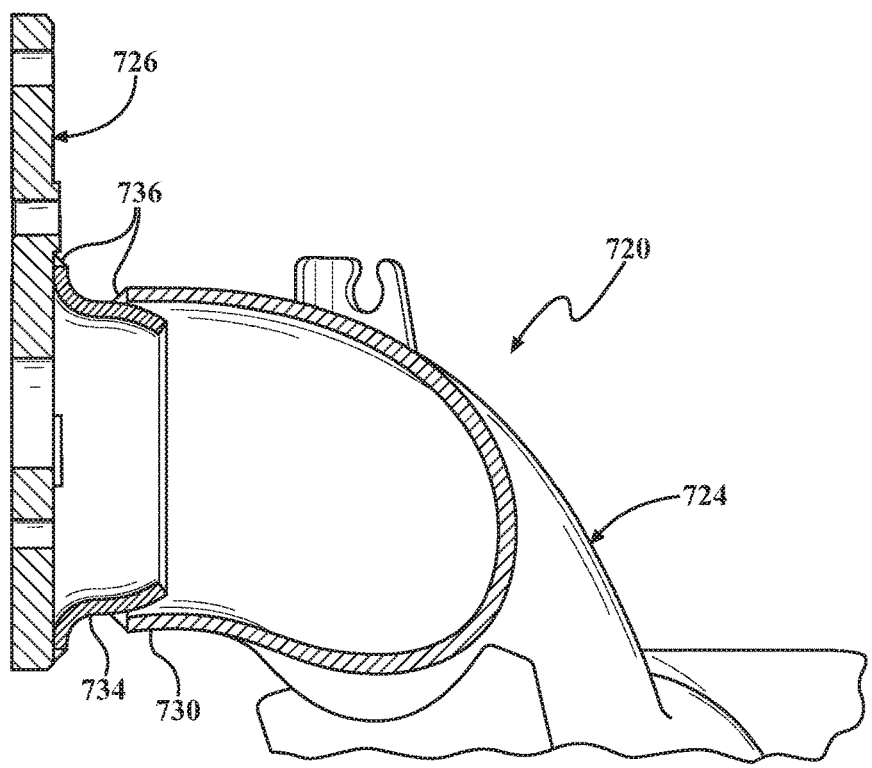
FIG. 10 is a sectional view of the eighth embodiment of the twist axle assembly.

Referring now to FIG. 10, an eighth exemplary embodiment of the twist axle assembly 720 is generally shown wherein like numerals, separated by a prefix of "7", identify corresponding parts with the above-described embodiments. This embodiment is similar to the one of FIG. 9, but the flange 734 is curved radially outwardly where it meets the remainder of the spindle plate 726 to provide a greater surface of contact between the flange 734 and the remainder of the spindle plate 726.

Figure 11:
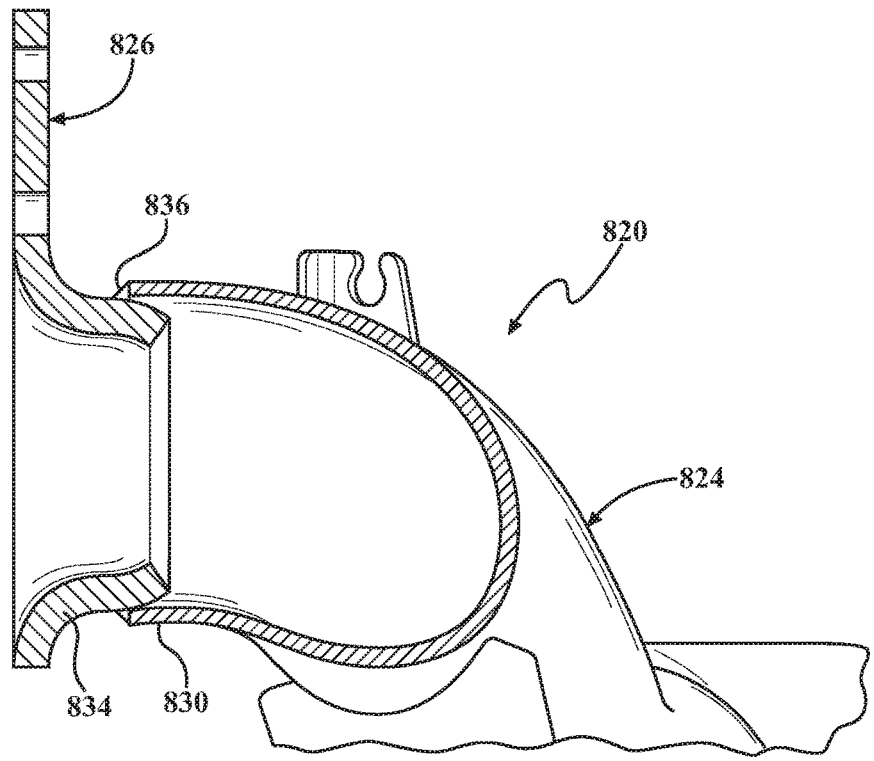
FIG. 11 is a sectional view of the ninth embodiment of the twist axle assembly.

Referring now to FIG. 11, a ninth exemplary embodiment of the twist axle assembly 820 is generally shown wherein like numerals, separated by a prefix of "8", identify corresponding parts with the above-described embodiments. In this embodiment, the spindle plate 826, including the flange 834, is made as a single, monolithic piece, and the flange 834 is formed into the spindle plate 826 through bending during a stamping operation. Thus, in this embodiment, the flange 834 has a similar wall thickness as the remainder of the spindle plate 826.

Another aspect of the present invention is related to a method of making a twist axle assembly 20, such as any of the embodiments discussed above. The reference numbers for the first embodiment shown in FIGS. 1-4 are used in the following discussion, but it should be appreciated that the following teachings may be applicable to one or more of the other embodiments as well. The method includes the step of preparing the cross beam 22. The method continues with the step of fixedly attaching the trailing arms 24 with the opposite ends of the cross beam 22. For each of the trailing arms 24, the method continues with the step of receiving a generally circular male projection on either the trailing arm 24 or the spindle plate 26 within a generally circularly shaped female socket on the other of the trailing arm 24 and the spindle plate 26. The method continues with the step of articulating and/or rotating the spindle plate 26 relative to the trailing arm 24 until the spindle plate 26 is in a predetermined orientation relative to the trailing arm 24 while maintaining a ring of surface-to-surface contact between the male projection and the female socket. After the spindle plate 26 is in the predefined orientation, the method proceeds with the step of fixedly attaching the trailing arm 24 with the spindle plate 26 to maintain the spindle plate 26 in the predetermined orientation.

The use of orientation terms, such as "top", "bottom" and "side", herein are in reference to the orientations of the features in one or more of the drawings, and these terms are not meant to require a particular orientation or otherwise be limiting in nature.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A twist axle assembly for a vehicle, comprising:
a cross beam extending along a length between opposite ends;
a pair of trailing arms, said trailing arms being fixedly attached with said opposite ends of said cross beam;
a spindle plate fixedly attached with each of said trailing arms; and
for each spindle plate and trailing arm combination, said spindle plate and trailing arm being provided with cooperating orbital adjustment features which allow an orientation of said spindle plate relative to said trailing arm to be adjusted prior to said spindle plate being fixedly attached with said trailing arm for allowing preselection of all of a camber angle, a caster angle, and a toe angle out of many possible camber, caster, and toe angles possible with the spindle plate and trailing arm for a wheel to be coupled with said spindle plate.

2. The twist axle assembly as set forth in claim 1 wherein said cooperating orbital adjustment features include a male projection formed onto one of said spindle plate and said trailing arm and include a female socket formed into the other of said spindle plate and said trailing arm.

3. The twist axle assembly as set forth in claim 2 wherein at least one of said male projection and said female socket is curved radially inwardly or outwardly adjacent a respective distal end and wherein said male projection and said female socket are fixedly attached with one another via a weld joint that is located at a ring of surface-to-surface contact along the area of the male projection or female socket that is curved radially inwardly or radially outwardly.

4. The twist axle assembly as set forth in claim 3 wherein both of said male projection and said female socket are curved radially adjacent their respective distal ends.

5. The twist axle assembly as set forth in claim 3 wherein said female socket is a flange formed on said spindle plate and wherein said male projection is an end of said trailing arm.

6. The twist axle assembly as set forth in claim 5 wherein said spindle plate, including said flange, is made as a monolithic piece.

7. The twist axle assembly as set forth in claim 5 wherein said flange is initially made as a separate piece from and is fixedly attached with the remainder of said spindle plate.

8. The twist axle assembly as set forth in claim 3 wherein said female socket is an end of said trailing arm and wherein said male projection is a flange on said spindle plate.

9. The twist axle assembly as set forth in claim 8 wherein said spindle plate, including said flange, is made as a monolithic piece.

10. The twist axle assembly as set forth in claim 8 wherein said flange is initially made as a separate piece from and is fixedly attached with the remainder of said spindle plate.

11. A method of making a twist axle assembly, comprising the steps of:
fixedly attaching trailing arms with opposite ends of a cross beam;
for each of the trailing arms, inserting a male projection on the trailing arm or a spindle plate into a female socket on the other of the trailing arm or the spindle plate, and
articulating the spindle plate relative to the trailing arm until the spindle plate is in a predetermined orientation with a ring of surface-to-surface contact being present between the male projection and the female socket, and
fixedly attaching the spindle plate with the trailing arm at the ring of surface-to-surface contact to maintain the spindle plate in the predetermined orientation with a selected camber angle, a selected caster angle, and a selected toe angle out of many possible arrangements possible using the spindle plate and the trailing arm.

12. The method as set forth in claim 11 wherein the step of fixedly attaching the spindle plate with the trailing arm is further defined as welding the spindle plate to the trailing arm.

13. The method as set forth in claim 11 wherein the male projection is on the trailing arm and the female socket is on the spindle plate.

14. The method as set forth in claim 11 wherein the male projection is on the spindle plate and the female socket is on the trailing arm.

15. The method as set forth in claim 11 wherein at least one of the male projection and the female socket is curved radially inwardly or outwardly near respective distal end to allow for the ring of surface-to-surface contact between the male projection and the female socket when the spindle plate is in the predetermined orientation and wherein the ring of surface-to-surface contact is at an area where the male projection or the female socket is curved radially inwardly or outwardly.

* * * * *